United States Patent
Haraguchi et al.

(10) Patent No.: US 7,647,161 B2
(45) Date of Patent: Jan. 12, 2010

(54) FUEL INJECTION CONTROLLER AND FUEL INJECTION SYSTEM USING THE SAME

(75) Inventors: Hiroshi Haraguchi, Kariya (JP); Akikazu Kojima, Gamagori (JP); Youhei Morimoto, Kariya (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 12/269,074

(22) Filed: Nov. 12, 2008

(65) Prior Publication Data
US 2009/0132152 A1    May 21, 2009

(30) Foreign Application Priority Data
Nov. 19, 2007    (JP) .............................. 2007-299440

(51) Int. Cl.
*B60T 7/12* (2006.01)
*F03B 3/00* (2006.01)

(52) U.S. Cl. ........................ 701/103; 701/104; 701/106; 123/299; 123/436

(58) Field of Classification Search ................. 701/103, 701/104, 106, 111, 114, 115; 123/294, 299, 123/305, 436, 478, 480
See application file for complete search history.

(56) References Cited

U.S. PATENT DOCUMENTS

| 6,691,671 | B2 * | 2/2004 | Duffy et al. ................. 123/299 |
| 6,755,176 | B2 * | 6/2004 | Takeuchi et al. ............ 123/299 |
| 6,988,030 | B2 * | 1/2006 | Asano et al. ................. 701/103 |
| 2003/0164166 | A1 * | 9/2003 | Takeuchi et al. ............ 123/674 |
| 2008/0243358 | A1 | 10/2008 | Kojima et al. |

FOREIGN PATENT DOCUMENTS

| JP | 11-82121 | 3/1999 |
| JP | 2004-100559 | 4/2004 |

* cited by examiner

*Primary Examiner*—John T Kwon
(74) *Attorney, Agent, or Firm*—Nixon & Vanderhye, PC (57) ABSTRACT

A fuel injector performs a main injection and a pilot injection prior to the main injection. A fuel injection controller detects an ignition timing of a fuel injected at the main injection, detects a driving condition of the internal combustion engine, and varies a pilot injection quantity of the pilot injection when the driving condition is stable. Furthermore, the controller detects a variation in ignition timing due to a variation in the pilot injection quantity, and learns the pilot injection quantity based on the variation in ignition timing due to the variation in the pilot injection quantity.

6 Claims, 8 Drawing Sheets

FUEL INJECTION CONTROLLER AND FUEL INJECTION SYSTEM USING THE SAME

CROSS-REFERENCE TO RELATED APPLICATION

This application is based on Japanese Patent Application No. 2007-299440 filed on Nov. 19, 2007, the disclosure of which is incorporated herein by reference.

FIELD OF THE INVENTION

The present invention relates to a fuel injection controller which controls a fuel injection by a fuel injector and a fuel injection system using the same. The fuel injector performs a main injection and a pilot injection prior to the main injection during one combustion cycle.

BACKGROUND OF THE INVENTION

JP-11-82121A shows a fuel injection controller in which an ignition timing of a main injection is detected and a pilot injection quantity is controlled based on the detected ignition timing of the main injection.

In this controller, although a pilot injection is commanded, when the ignition timing of the main injection is retarded more than a case that the pilot injection is performed, the controller determines that no pilot injection is performed due to a manufacturing dispersion of the fuel injector and the like. Then, the controller increases a pilot injection quantity.

The pilot injection, which is performed prior to the main injection, advances the ignition timing of the main injection so that a rapid combustion in the main injection is restricted. Thereby, NOx and the combustion noise can be reduced.

If possible, the combustion waveform by the pilot injection may be directly analyzed so that the pilot injection quantity can be controlled.

Since the pilot injection quantity is very small, the variation in sensor signal indicative of the combustion waveform by the pilot injection is also small. The sensor signal indicative of the combustion waveform is hardly distinguished from noises, and the combustion waveform might be erroneously detected. Hence, as shown in JP-11-82121A, the pilot injection quantity is controlled based on the ignition timing of the main injection.

The ignition timing of the main injection varies according to a fuel property such as cetane number as well as a variation in injection characteristic due to an individual difference and aging of the fuel injector. For example, even if the pilot injection quantity is unchanged, when the cetane number is different, the combustion condition such as combustion quantity per unit time varies. As the result, in a case that the pilot injection quantity is unchanged, as the cetane number decreases, the ignition timing of the main injection is retarded. As the cetane number increases, the ignition timing of the main injection is advanced. When the pilot injection quantity is increased on detecting the retard of the ignition timing of the main injection, the ignition timing of the main injection can be advanced, however, an optimum pilot injection quantity cannot be established.

The excessive pilot injection quantity causes large combustion noise and generates the smoke. The insufficient pilot injection quantity retards the ignition timing of the main injection, so that the emission is deteriorated and the combustion noise becomes large due to the rapid combustion by the main injection.

The above matters occur with respect to an ignition delay time relative to a main ignition command. When the ignition timing is varied, the ignition delay time is also varied. If the pilot injection is increased in a case that the ignition delay time is long, the ignition delay time can be reduced, however, the optimum pilot injection quantity can not be established.

The present invention is made in view of the above matters, and it is an object of the present invention to provide a fuel injection controller which is able to learn an optimum pilot injection quantity based on a variation in ignition timing of the main injection, and provide a fuel injection system using the same.

According to the inventors' study, an ignition timing and an ignition delay time of a main injection vary due to an individual difference and deterioration with age of a fuel injector and a fuel property such as cetane number. As a pilot injection quantity increases, a variation in ignition timing or ignition delay time decreases. As the pilot injection quantity decreases, the variation in ignition timing or ignition delay time increases.

The inventors have found a boundary of the pilot injection quantity in which the variation in ignition timing or ignition delay time is within a specified range even when the pilot injection quantity is varied. Such a pilot injection quantity is the optimum value.

According to the present invention, when the engine driving condition is stable and the pilot injection quantity is varied, the pilot injection quantity is learned based on a variation in ignition timing of the fuel which is injected at the main injection.

Hence, an optimum pilot injection quantity can be learned in which the variation in ignition timing is within a specified range when the pilot injection quantity is varied to the optimum quantity.

The variation in ignition timing represents not only an advanced quantity and a retard quantity of the ignition timing of the main injection but also a decreased quantity and increased quantity of the injection delay time of the main injection due to a variation in pilot injection quantity. When the ignition timing is advanced, the ignition delay time is decreased. When the ignition timing is retarded, the ignition delay time is increased. Thus, the advanced quantity and the retarded quantity of the ignition timing substantially correspond to the increased quantity and decreased quantity of the ignition delay time.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Figure 1:
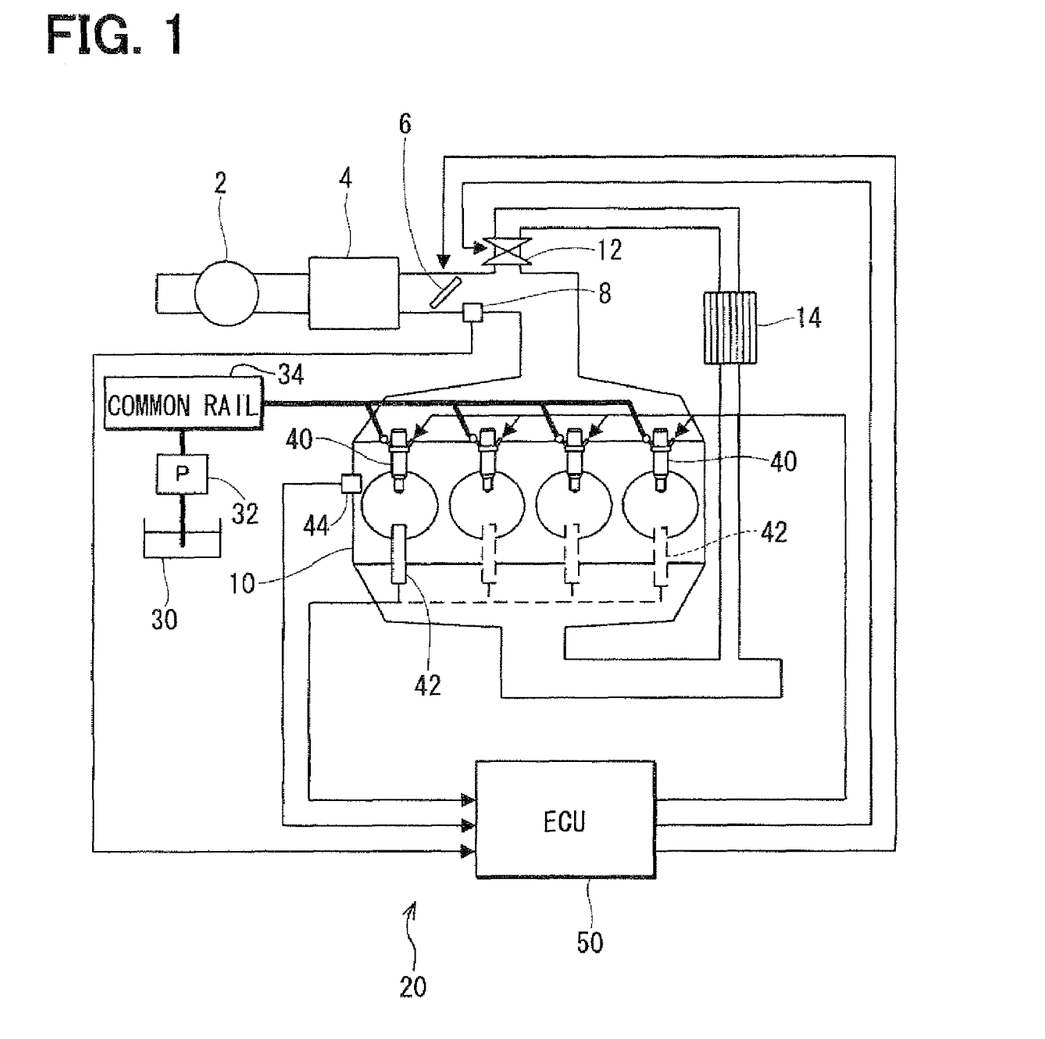
FIG. 1 is a schematic view showing a fuel injection system according to an embodiment of the present invention.

Hereafter, an embodiment of the present invention is described. FIG. 1 is a schematic view showing a fuel injection system according to the present embodiment.

(Fuel Injection System 20)

An accumulation fuel injection system 20 includes a high-pressure pump 32, a common rail 34, fuel injectors 40, combustion pressure sensors (CPS) 42, and an electronic control unit (ECU) 50.

A diesel engine 10 to which the fuel injection system 20 supplies the fuel is a four-cylinder diesel engine. An intake air compressed by a compressor 2 flows through an intercooler 4. A throttle valve 6 adjusts the intake air quantity which is introduced into each cylinder of the engine 10. When the engine 10 is in low load region, the throttle valve 6 restricts an air passage in order to perform an exhaust gas recirculation (EGR). When the engine 10 is in high load region, the throttle valve 6 is fully opened to increase the intake air quantity and reduce a pumping loss. An intake air pressure is detected by an intake air pressure sensor 8.

An EGR valve 12 adjusts recirculating exhaust gas quantity which is cooled by an EGR cooler 14. The high-pressure pump 32 pressurizes the fuel which is introduced into a pressurizing chamber from a fuel tank 30. The ECU 50 controls a fuel suction quantity which the high-pressure pump 32 suctions, so that a fuel discharge quantity of the high-pressure pump 32 is also controlled.

The common rail 34 accumulates the pressurized fuel pumped up by the high-pressure pump 32, and holds the fuel pressure at a specified value according to an engine driving condition. The pressure in the common rail 34, which is referred to as common rail pressure, is controlled by the high-pressure pump 32 and a pressure regulating valve (not shown) provided in the common rail 34.

The fuel injector 40 is respectively provided to each cylinder of the engine 10 and injects fuel accumulated in the common rail 34 into each cylinder. The fuel injector 40 performs a multi injection including a pilot injection, a main injection and a post injection during a one combustion stroke. The fuel injector 40 is a well known electromagnetic valve having a control chamber. A pressure in the control chamber is controlled to adjust fuel injection quantity.

The CPS 42 is a pressure sensor which detects pressure in the cylinder of the engine 10. As shown by a solid line and a dashed line in FIG. 1, the CPS 42 may be provided to each of four cylinders. Alternatively, as shown by the solid line in FIG. 1, the CPS 42 may be provided to one of four cylinders. An NE sensor 44 detects rotational speed of the diesel engine 10.

The ECU 50 controls the high-pressure pump 32, the pressure regulating valve in the common rail 34 and the fuel injector 40 based on the signals from the intake pressure sensor 8, the CPS 42, the NE sensor and the like in order to drive the diesel engine 10 optimally.

The ECU 50 controls the fuel injection timing and the fuel injection quantity. The ECU 50 outputs injection pulse signals as fuel injection command signals. When the pulse width of the injection pulse signal becomes longer, the fuel injection quantity increases. The ECU 50 stores an injection quantity characteristic, which represents a relationship between the pulse width of the injection pulse signal and the injection quantity, with respect to every injection pressure in a ROM or flash memory as a map.

(Main Ignition Timing)

Figure 2:
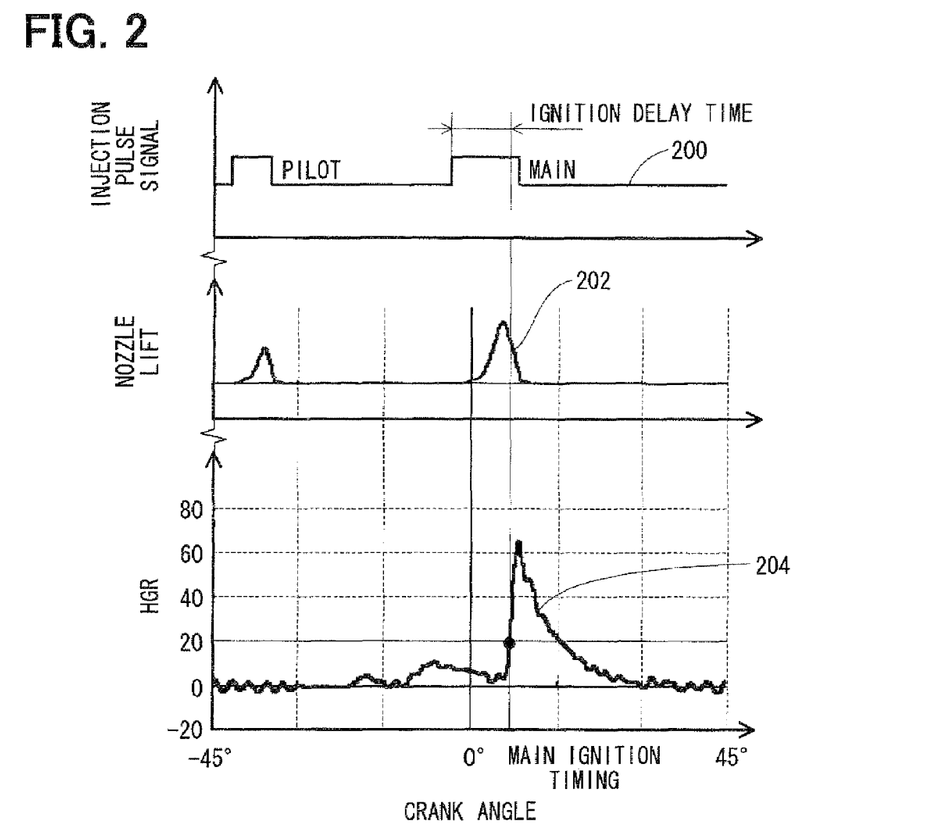
FIG. 2 is a time chart showing variations in injection pulse signal, nozzle lift and heat generation rate at the pilot injection and the main injection.

Referring to FIG. 2, an ignition timing of the main injection will be described. The pilot injection is performed prior to the main injection.

As shown in an upper part of FIG. 2, the ECU 50 outputs the injection pulse signal 200 which commands the injection timing and the injection quantity with respect to the pilot injection and the main injection. As shown in a middle part of FIG. 2, an opening timing and a closing timing of the fuel injector 40 are retarded with respect to the injection pulse signal. The ECU 50 stores the delay of opening timing and closing timing of the fuel injector 40, and adjusts a rising timing of the injection pulse signal and the pulse width of the injection pulse signal.

The ECU 50 computes an injection command timing and target ignition timing of the main injection and outputs the injection pulse signal. Then, the ECU 50 feedback controls the injection command timing based on a difference between an actual ignition timing and a target ignition timing.

The actual ignition timing of the main injection is detected by computing a heat generation rate (HGR) according to the following equation.

$$\text{Heat Generation Rate}(HGR) = (V \cdot dP + \kappa \cdot P \cdot dV)/(\kappa - 1) \quad (1)$$

wherein "V" represents cylinder volume, "P" represents cylinder pressure detected by the CPS 42, and "κ" represents specific heat ratio. A timing in which the HGR of the main injection exceeds a specified threshold is established as the ignition timing of the main injection. In FIG. 2, "20" is the threshold of the HGR.

Figure 3:
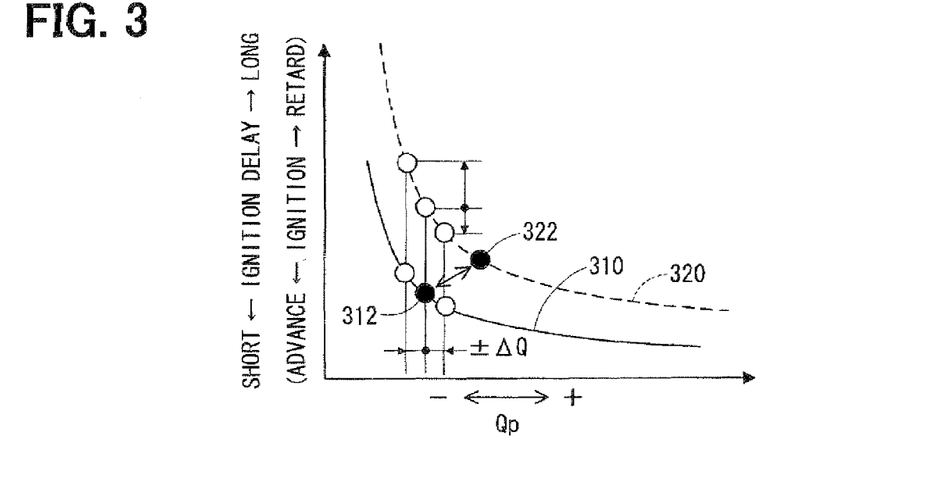
FIG. 3 is a chart showing a relationship between a pilot injection quantity and the ignition timing while cetane number is varied.

The ignition delay time from the rising timing of the injection pulse signal to the actual ignition timing varies according to the individual difference and the aging of the fuel injector 40, the aging of the EGR valve 12, or the cetane number. As shown in FIG. 3, the ignition timing of the main ignition varies relative to the pilot injection quantity Qp. In FIG. 3, a solid line 310 represents a characteristic in a case that the cetane number is high, and a dashed line 320 represents a characteristic in a case that the cetane number is low.

Without respect to the cetane number, as the pilot injection quantity decreases, the ignition timing is retarded, and as the pilot injection quantity increases, the ignition timing is advanced. When the pilot injection quantity Qp exceeds a predetermined value, the variation in ignition timing decreases relative to the variation in pilot injection quantity Qp. Besides, when the cetane number increases, the ignition timing is advanced with respect to the same pilot injection quantity Qp.

When the ignition timing is retarded and the ignition delay time is increased by decreasing the pilot injection quantity Qp, the emission is deteriorated and the combustion noise due to the main injection is increased. When the ignition timing is advanced and the ignition delay time is decreased by increasing the pilot injection quantity Qp, the smoke is generated and the combustion noise due to the pilot injection is increased.

The inventors of the present invention have found that the pilot injection quantity Qp becomes optimum at a boundary point at which both of the advanced quantity and the retarded quantity of the ignition timing is within a specified range when the pilot injection quantity Qp is varied. In FIG. 3, two dots 312, 322 represent the boundary points. The position of the dots 312,322 varies according to the cetane number.

(Function of the ECU 50)

The ECU 50 performs control programs stored in the ROM or the flash memory to learn the optimum pilot injection quantity.

(1) Detection of Ignition Timing

The ECU 50 computes the heat generation rate HGR according to the above formula (1) based on the detected signal of the CPS 42. The ECU 50 detects the timing in which the HGR of the main injection exceeds the specified threshold as the ignition timing of the main injection.

(2) Detection of Driving Condition

The ECU 50 detects an engine driving condition from the various sensors in order to detect a learning condition for learning the pilot injection quantity Qp.

(3) Determination of Stable Condition

The ECU 50 determines whether the engine driving condition is stable. The learning condition is satisfied when the engine is at idle or at a predetermined range of the engine driving condition. When the learning is performed at idle of the engine, the detected ignition timing can be converted to be applied to the other driving condition.

(4) Variation in Fuel Injection Quantity

The ECU 50 adjusts the pulse width of the injection pulse signal to vary the pilot injection quantity Qp.

(5) Detection of Ignition Variation

The ECU 50 detects an advanced quantity and a retarded quantity of the ignition timing relative to the ignition timing at a center value Q0 of the pilot injection quantity Qp when the pilot injection quantity Qp is varied by a specified value ΔQ from its center value Q0. Alternatively, the ECU 50 detects an increase amount and decrease amount of the ignition delay time relative to the ignition delay time at the center value Q0 of the pilot injection quantity Qp when the pilot injection quantity Qp is varied by a specified value ΔQ from its center value Q0.

(6) Learning of Fuel Injection Quantity

The ECU 50 varies the pilot injection quantity Qp with reference to the center value Q0 while the center value Q0 is varied, and learns the most optimum value of the pilot injection quantity Qp in which the variation in ignition timing or the variation in ignition delay time is within a specified range.

(7) Definition of Specified Range

After the ECU 50 defines a plurality of specified ranges of the engine driving condition, the ECU detects the ignition timing of the main injection with respect to the plurality of ranges of the engine driving condition, and learns the pilot injection quantity Qp based on the variation in detected ignition timing. The ECU 50 applies the pilot injection quantity Qp learned in each range of the engine driving condition to a specified range of the engine driving. That is, the defined range of the engine driving condition is a range which the ECU 50 evaluates the same range for learning the pilot injection quantity.

(8) Feedback Control of Injection Timing

After the ECU 50 learns the most optimum pilot injection quantity Qp, the ECU 50 establishes a base injection timing and a target ignition timing. Then, the ECU 50 computes a feedback amount of the injection timing based on the difference between the actual ignition timing and the target ignition timing in order that the actual ignition timing agrees with the target ignition timing.

(Pilot Injection Quantity Learning)

Referring to FIGS. 4 to 11, the learning of the pilot injection quantity will be described.

(Feedback Routine)

Figure 4:
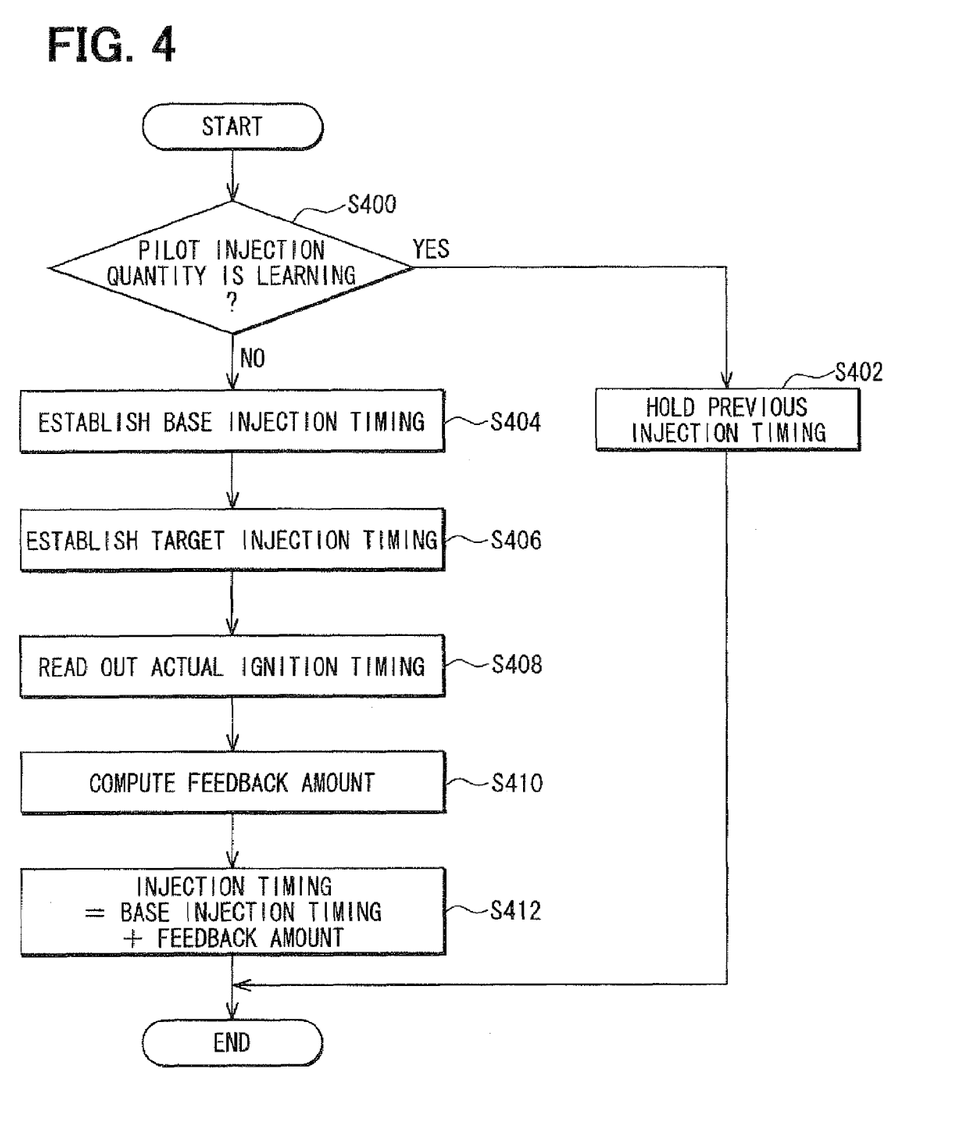
FIG. 4 is a flowchart showing a feedback routine.

Referring to FIG. 4, an injection timing feedback routine will be described. The pilot injection quantity which is injected in the feedback routine is the most optimum routine learned in a pilot injection quantity learning routine.

In step S400, the ECU 50 determines whether the pilot injection quantity is learning now. This determination is performed based on an On-Off state of a learning flag, which will be described later.

When the answer is Yes in step S400, the procedure proceeds to step S402 in which the feedback control of the injection timing is not performed and a previously computed injection timing is held.

When the answer is No in step S400, the procedure proceeds to step S404 in which the ECU 50 establishes a base injection timing according to the engine driving condition. Then, the procedure proceeds to step S406 in which the target ignition timing is established.

In step S408, the ECU 50 reads out the actual ignition timing from the memory. In step S410, the ECU 50 computes a feedback amount of the injection timing based on a difference between the actual ignition timing and the target ignition timing in order that the actual ignition timing agrees with the target ignition timing.

In step S412, the ECU 50 corrects the base injection timing with the computed feedback amount to end the routine. When the injection timing is feedback controlled, the ECU 50 does not change a time interval between the pilot injection and the main injection, but changes the injection timing of both of the pilot injection and the main injection.

(Ignition Timing Detecting Routine)

Figure 5:
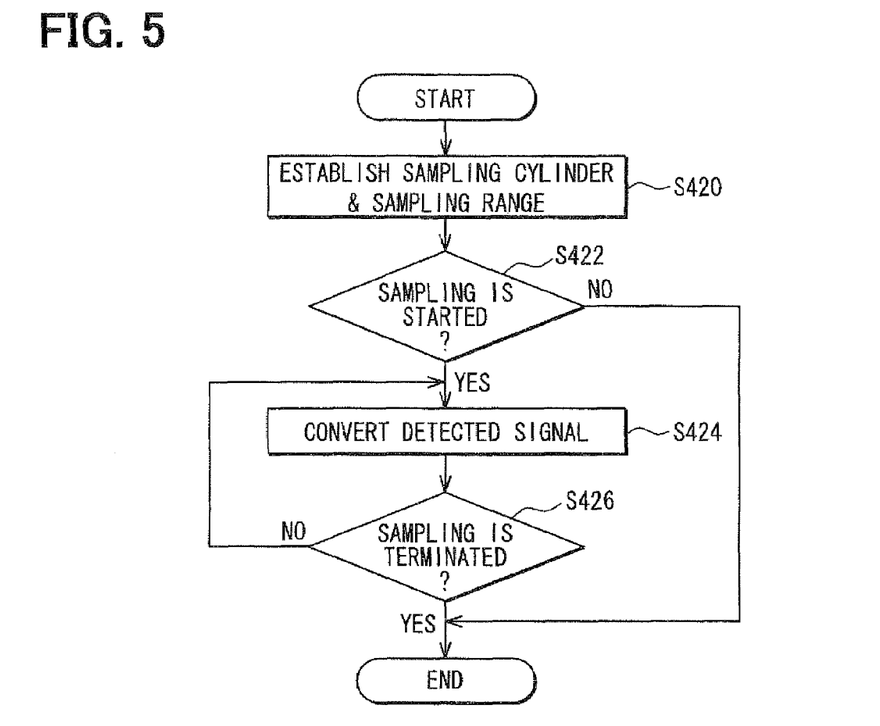
FIGS. 5 to 7 are flowcharts showing an ignition timing detecting routine.
Figure 6:
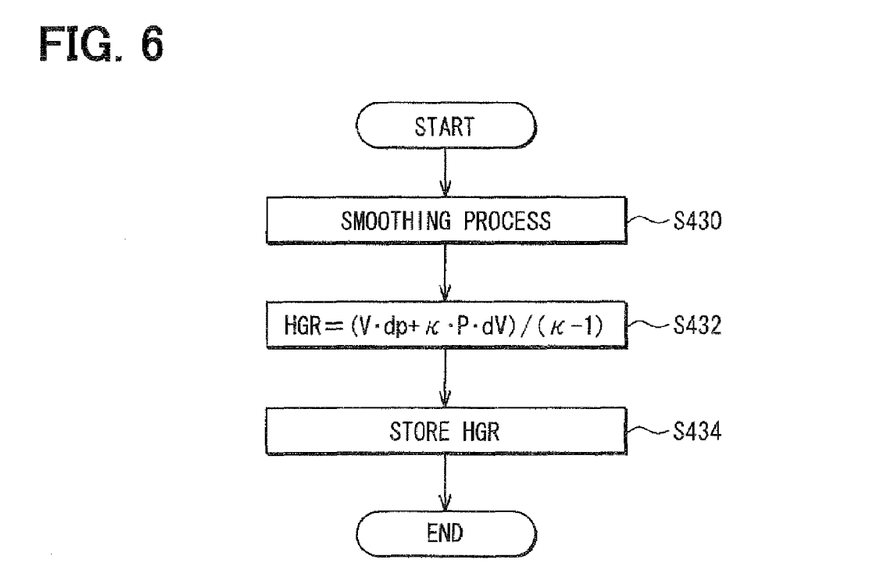
Figure 7:
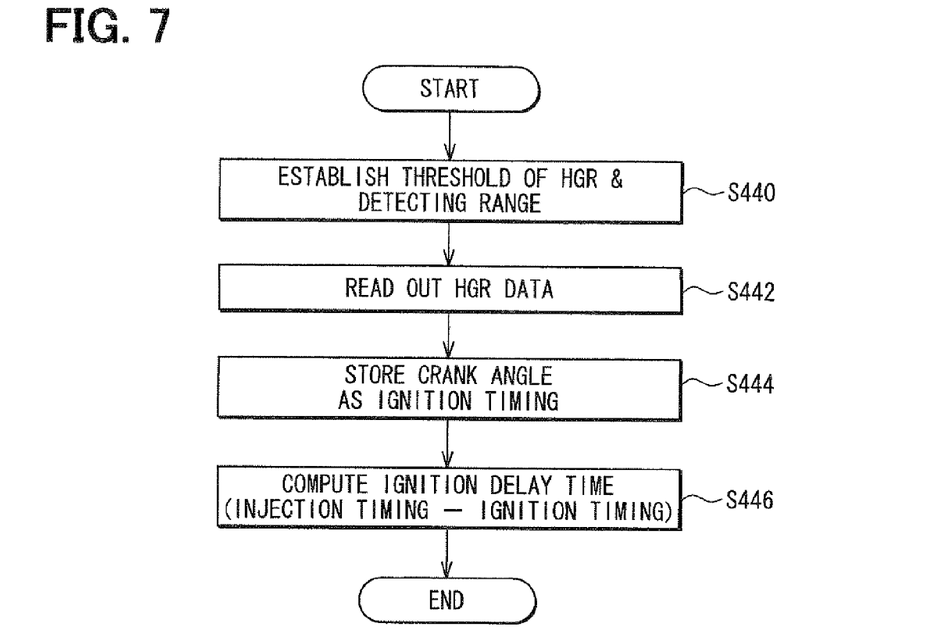

FIGS. 5, 6, and 7 show ignition timing detecting routine.

In step S420, the ECU 50 establishes a sampling cylinder in which the detected signal of the CPS 42 is sampled, and establishes a sampling range. The sampling range is established, for example, in a specified crank angle range. In a case that the CPS 42 is provided to only one cylinder, the ECU 50 establishes only sampling range.

In step S422, the ECU 50 determines whether the crank angle of the sampling cylinder reaches the sampling range. When the sampling has not been started yet, that is, when the answer is No in step S422, the ECU 50 ends the routine.

When the answer is Yes in step S422, the procedure proceeds to step S424 in which the detected signal of the CPS 42 is A/D converted in synchronization with the crank angle or a clock time, and the converted data is stored in the RAM or the flash memory.

In step S426, the ECU 50 determines whether the sampling range is terminated. When No, the procedure goes back to step S424, and when Yes, the routine ends.

In step S430 of FIG. 6, the ECU 50 performs a smoothing of the detected signal of the CPS 42 stored in step S424 by computing an average of the detected signal in the sampling range.

In step S432, the ECU 50 substitutes the smoothed detected signal into the above equation (1) to compute the heat generation rate (HGR). In step S434, the ECU 50 stores the HGR which is computed with respect to each crank angle in the sampling range to end the routine.

In step S440 of FIG. 7, the ECU 50 establishes a threshold of the HGR for detecting the ignition timing of the main injection, and establishes a detecting range of the ignition timing.

In step S442, the ECU 50 reads out the HGR data stored in step S434. In step S444, the ECU 50 stores the crank angle as the ignition timing of the main injection at which the HGR passes the threshold ("20" in FIG. 2).

In step S446, the ECU 50 computes the difference between the rising timing of the injection pulse signal and the ignition timing of the main injection as the ignition delay time, and stores the ignition delay.

(Learning Request Routine)

Figure 8:
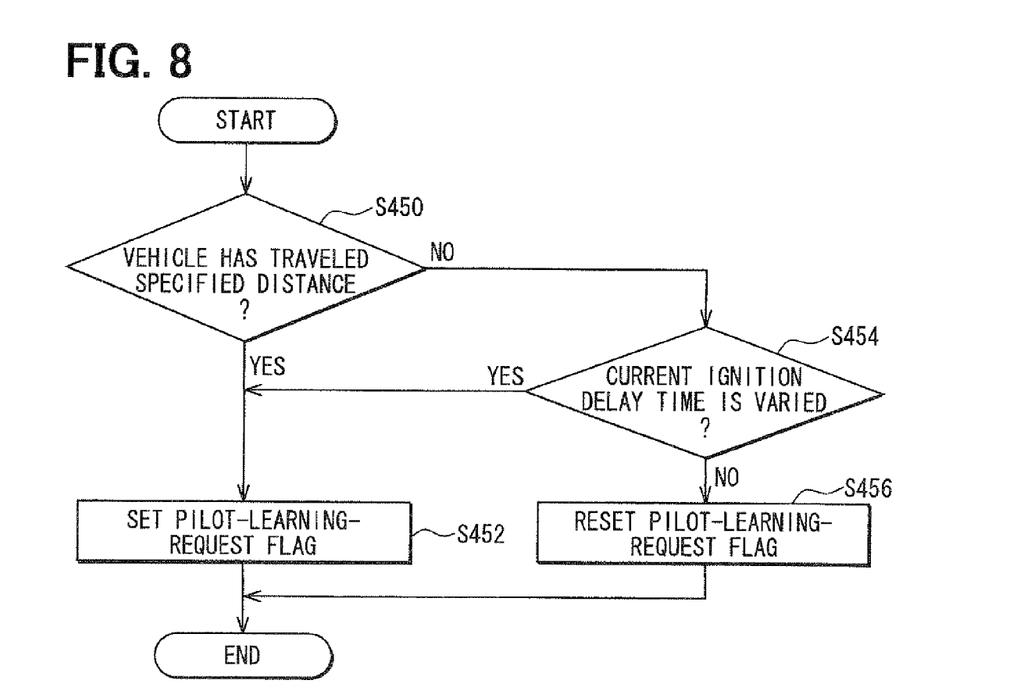
FIG. 8 is a flowchart showing a learning condition requirement routine.

FIG. 8 shows a learning request routine of the pilot injection quantity. When a pilot-learning-request flag is set, it is necessary to learn the pilot injection quantity. When the pilot-learning-request flag is reset, it is prohibited to learn the pilot injection quantity.

In step S450, the ECU 50 determines whether the vehicle has traveled a specified distance or more after the previous pilot learning is completed. The pilot injection quantity is learned when the vehicle is shipped.

When the answer is Yes in step S450, the procedure proceeds to step S452 in which the pilot-learning-request flag is set to end the routine. In a case that the vehicle has traveled the specified distance or more after the previous pilot learning is completed, the ignition timing of the main injection might be varied due to the aging. Thus, the ECU 50 requests to perform the pilot learning.

When the answer is No in step S450, the procedure proceeds to step S454 in which the ECU 50 determines whether the current ignition delay time of the main injection is varied relative to the delay time at the previous learning completion by a specified value or more.

When the answer is Yes in step S454, the procedure proceeds to step S452. Even if the vehicle has not traveled the specified distance, the fuel property such as cetane number may be varied. Thus, the ECU 50 sets the pilot-learning-request flag in step S452.

When the answer is No is step S454, the procedure proceeds to step S456 in which the ECU 50 resets the pilot-learning-request flag to end the routine.

(Learning Condition Determination Routine)

Figure 9:
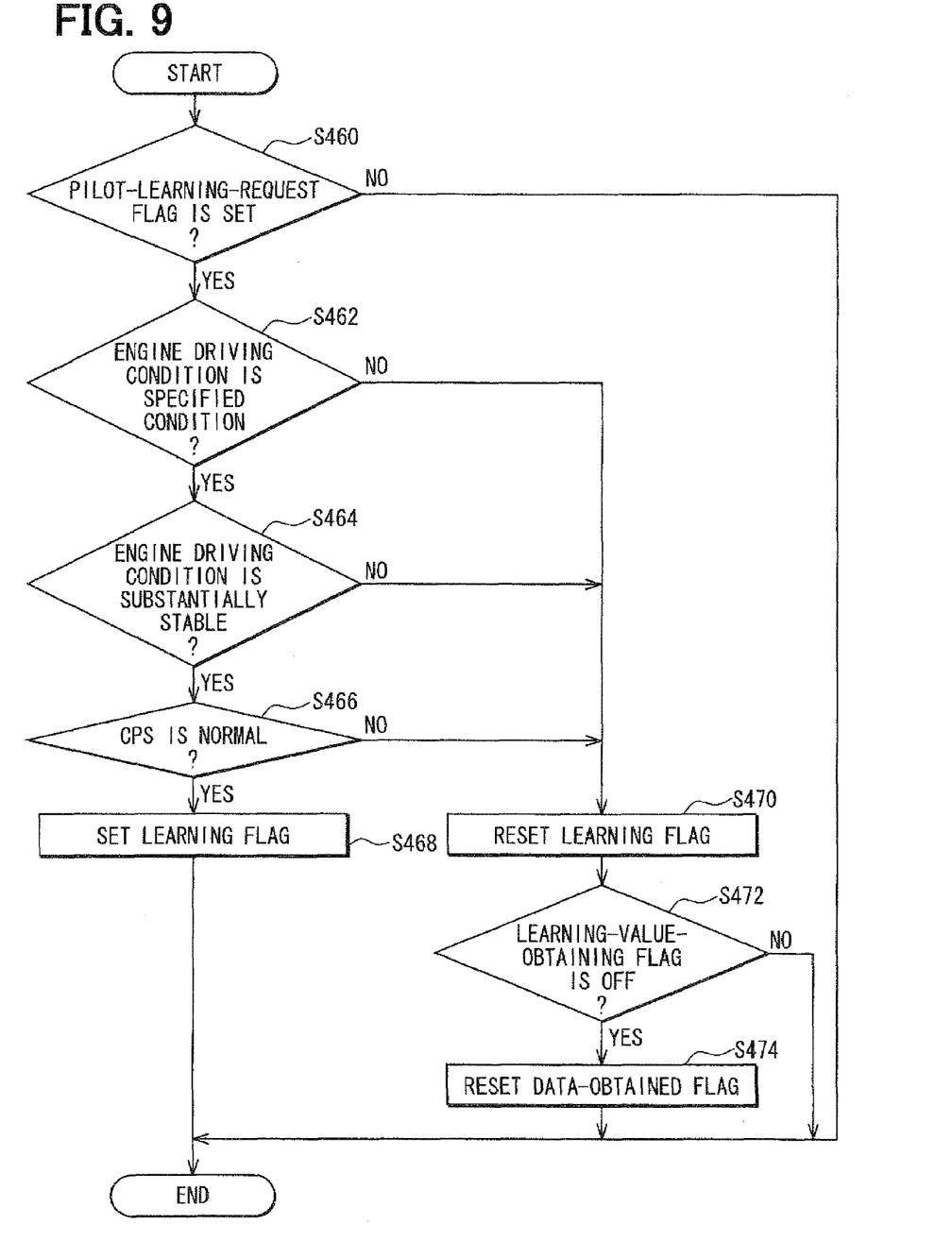
FIG. 9 is a flowchart showing a learning condition determining routine.

FIG. 9 shows a learning condition determination routine for determining whether the learning condition of the pilot injection quantity is satisfied.

In step S460, the ECU 50 determines whether the pilot-learning-request flag is set. When the answer is No, the ECU 50 ends this routine.

When the answer is Yes, the procedure proceeds to step S462 in which the ECU 50 determines whether the engine driving condition is a predetermined specified condition.

When the answer is Yes in step S462, the procedure proceeds to step S464 in which the ECU 50 determines whether the engine driving condition is substantially stable.

When the answer is Yes in step S464, the procedure proceeds to step S466 in which the ECU 50 determines whether the CPS 42 is normal. If the output signal of the CPS 42 is unchanged at low side or high side, the ECU 50 determines that the CPS 42 is faulty.

When the answer is Yes in step S466, the ECU 50 determines that the learning condition of the pilot injection quantity is satisfied and the procedure proceeds to step S468 in which the learning flag is set to end the routine.

When the answer in step S462, S464 or S466, the procedure proceeds to step 470 in which the ECU 50 resets the learning flag.

In step S472, the ECU 50 determines whether the learning of the pilot injection quantity is completed. When the answer is No in step S472, the ECU 50 terminates the routine. When the answer is Yes in step S472, the procedure proceeds to step S474.

The determination in step S472 is made according to an On-Off state of a learning-value-obtaining flag which will be described later. Even though the learning condition is not satisfied in steps S462, S464, S466, the On-state of the learning-value-obtaining flag represents that the learning of the variation in ignition timing has been completed. This variation in ignition timing is a difference between the ignition timing at a center value Q0 of a specified pilot injection quantity Qp and the ignition timing at the time when the center value Q0 is varied by $\Delta Q$.

In step S474, a data-obtained flag, which represents the data about the pilot injection quantity Qp and the date about the pilot injection quantity Qp±$\Delta Q$ are obtained, is reset to end the routine.

(Ignition Delay Time Detecting Routine)

Figure 10:
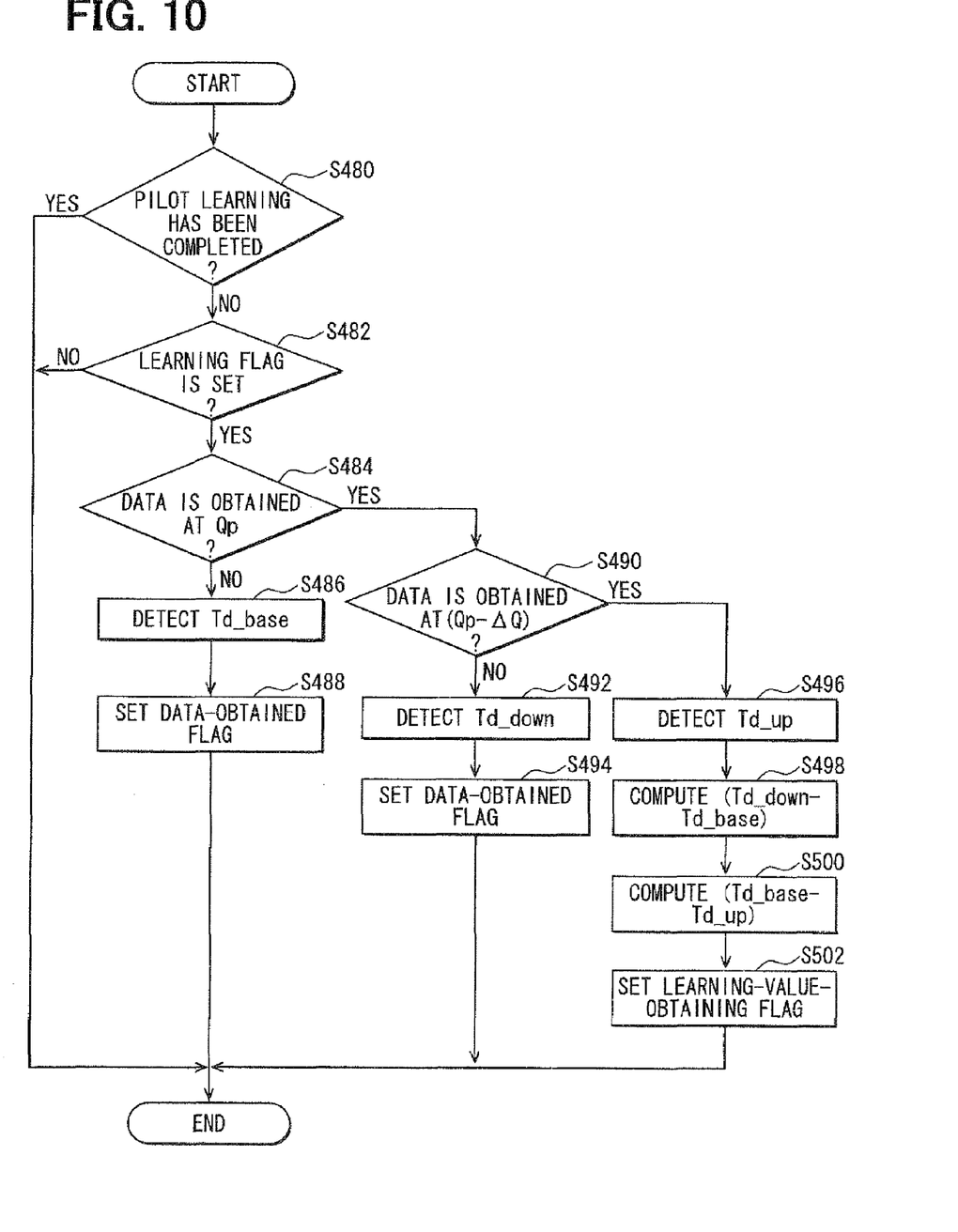
FIG. 10 is a flowchart showing an ignition delay time detecting routine.

FIG. 10 shows an ignition delay time detecting routine.

In step S480, the ECU 50 determines whether the pilot learning has been completed. This determination is made according to whether the pilot-learning-request flag and the learning-value-obtaining flag are set. When both of the pilot-learning-request flag and the learning-value-obtaining flag are set, the ECU 50 determines that the pilot learning has been completed. When at least one of the flags is reset, the ECU 50 determines that the pilot learning has not been completed.

When the pilot learning has been completed (Yes in step S480), the ECU 50 terminates this routine. When the pilot learning has not been completed (No in step S480), the procedure proceeds to step S482 in which the ECU 50 determines whether the learning flag is set.

When the learning flag is reset (No in step S482), the ECU 50 terminates this routine.

When the learning flag is set for learning (Yes in step S482), the procedure proceeds to step S484 in which the ECU 50 determines whether the ignition time delay of the main injection at the pilot injection quantity Qp is obtained.

When the answer is No in step S484, the procedure proceeds to step S486 in which the ECU 50 detects the ignition delay time Td_base at the pilot injection quantity Qp. In step S488, the ECU 50 sets the data-obtained flag at the pilot injection quantity Qp to terminate the routine.

When the answer is Yes in step S484, the procedure proceeds to step S490 in which the ECU 50 determines whether the ignition time delay of the main injection at the pilot injection quantity (Qp−$\Delta Q$) is obtained.

When the answer is No in step S490, the procedure proceeds to step S492 in which the ECU 50 detects the ignition delay time Td_down at the pilot injection quantity (Qp−$\Delta Q$). In step S494, the ECU sets the data-obtained flag at the pilot injection quantity (Qp−$\Delta Q$) to terminate the routine.

When the answer is Yes in step S490, the procedure proceeds to step S496 in which the ECU 50 detects the ignition delay time Td_up at the pilot injection quantity (Qp+$\Delta Q$). In step S498, the ECU 50 computes an increased quantity of the ignition delay time (Td_down−Td_base). In step S500, the ECU 50 computes the decreased quantity of the ignition delay time (Td_base−Td_up).

In step S502, the ECU 50 set the learning-value-obtaining flag to terminate the routine.

(Optimum Value Learning Routine)

Figure 11:
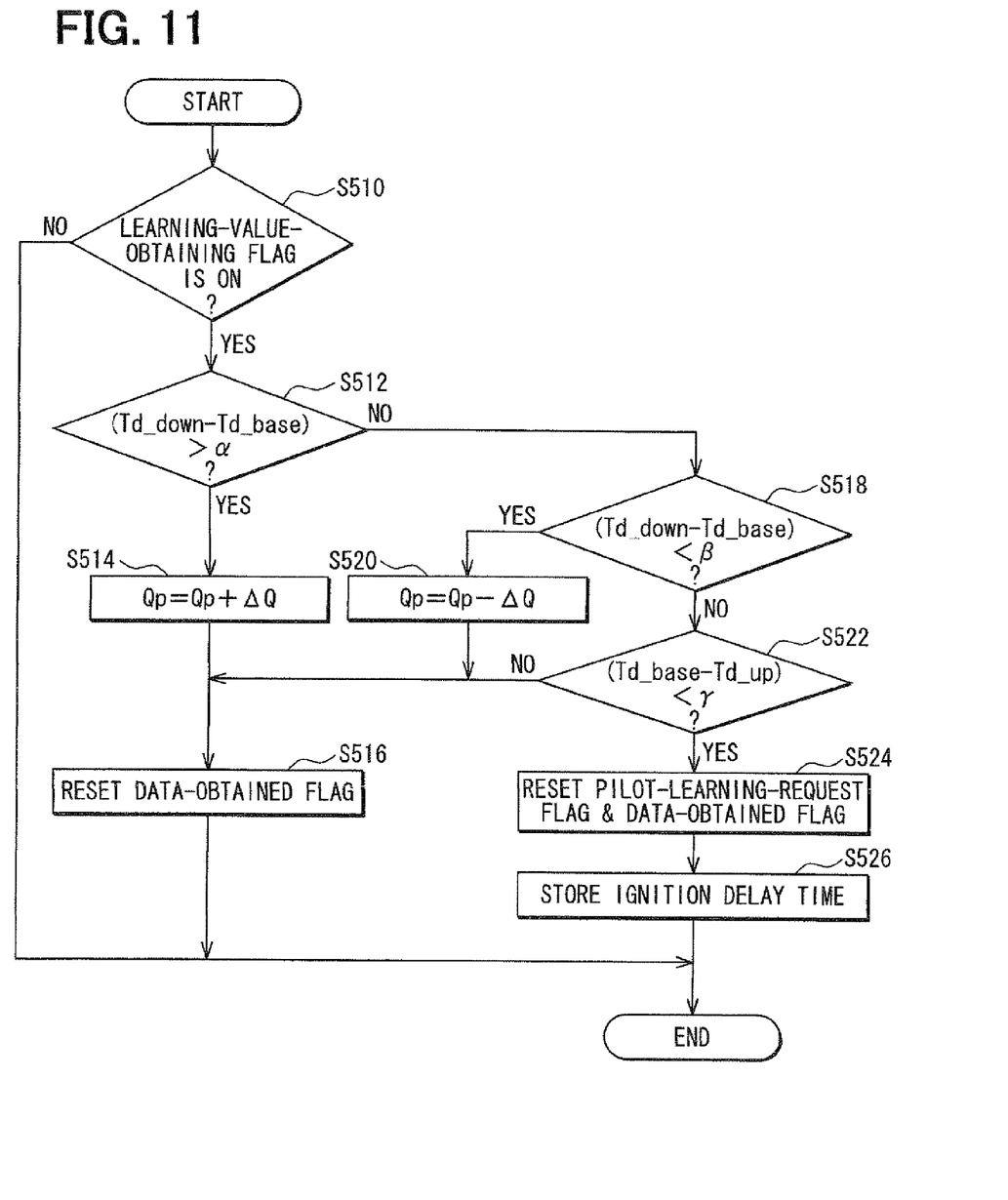
FIG. 11 is a flowchart showing an optimum value learning routine.

FIG. 11 shows an optimum value of the pilot injection quantity learning routine.

In step S510, the ECU 50 determines whether the learning-value-obtaining flag is On. When the answer is No in step S510, the ECU 50 terminates the routine.

When the answer is Yes in step S510, the procedure proceeds to step S512 in which the ECU 50 determines whether the increased quantity in ignition delay time (Td_down−Td_base) computed in step S498 exceeds a specified value α.

When the answer is Yes in step S512, the ECU 50 determines that the center value Q0 of the pilot injection quantity Qp is smaller than the optimum value (the dots 312, 322 in FIG. 3) and the procedure proceeds to step S514 in which the center value Q0 is increased by ΔQ.

Then, the procedure proceeds to step S516 in which the data-obtained flag at the pilot injection quantities Qp and (Qp−ΔQ) is reset to terminate the routine. When the answer is No in step S512, the ECU 50 determines that the center value Q0 of the pilot injection quantity Qp is not smaller than the optimum value.

The procedure proceeds to step S518 in which the ECU 50 determines whether the increased quantity in ignition delay time (Td_down−Td_base) is smaller than a specified value β. The specified value β is smaller than a specified value γ which will be used in step S522.

When the answer is Yes in step S518, the ECU 50 determines that the center value Q0 of the pilot injection quantity Qp is larger than the optimum value and decreases the center value Q0 to (Q0−ΔQ) in step S520. Then, the procedure proceeds to step S516.

When the answer is No in step S518, the procedure proceeds to step S522 in which the ECU 50 determines whether the decreased quantity in ignition delay time (Td_base−Td_up) is smaller than the specified value y.

Considering the characteristic shown in FIG. 3, when the answer is No in step S518 and the answer is No in step S522, such a determination result is incorrect if the detection result of the ignition timing is normal.

Thus, when the answer is No in step S522, the ECU 50 determines that the detection result of the ignition timing is incorrect. Then, the procedure proceeds to step S516 in which the detecting of the ignition timing is performed again.

When the answer is Yes in step S522, the ECU 50 determines that the ignition delay time of the main injection in a case that the center value Q0 of the pilot injection quantity Qp is varied by ΔQ is within a specified range of the variation. In step S524, the ECU 50 resets the pilot-learning-request flag and the data-obtained flag at the pilot injection quantity Qp, (Qp−ΔQ)

In step S526, the ECU 50 stores the ignition delay time of the main injection in the RAM and terminates the routine.

The ECU 50 performs the pilot injection by the learned optimum value of the pilot injection quantity so that the ignition timing of the main injection agrees with the target ignition timing.

As described above, according to the present embodiment, even if the ignition timing of the main injection varies due to the individual difference and the deterioration with age of the fuel injector 40, the deterioration with age of the EGR valve 12, and the fuel property of the cetane number, the fuel injection timing can be feedback controlled based on the learned pilot injection quantity in such a manner that the ignition timing of the main injection becomes optimum for the engine driving condition.

Other Embodiment

While the pilot injection quantity at the center value is varied, the ignition timing at the center value or the variation in ignition delay time at center value is compared with each other. The center value at which the variation in ignition timing and ignition delay time is within a predetermined range may be established as a learning value of the pilot injection quantity.

The present invention is not limited to the embodiment mentioned above, and can be applied to various embodiments.

What is claimed is:

1. A fuel injection controller controlling a fuel injection with a fuel injector which performs a main injection and a pilot injection prior to the main injection into a cylinder during one combustion cycle of a compression-ignition internal combustion engine, the fuel injection controller comprising:
   an ignition timing detecting means for detecting an ignition timing of a fuel injected at the main injection;
   a driving condition detecting means for detecting a driving condition of the internal combustion engine;
   a stable condition determining means for determining whether the driving condition is a specified stable condition;
   an injection quantity varying means for varying a pilot injection quantity of the pilot injection when the driving condition of the internal combustion engine is the stable condition,
   an ignition variation detecting means for detecting a variation in ignition timing due to a variation in the pilot injection quantity; and
   an injection quantity learning means for learning the pilot injection quantity based on the variation in ignition timing due to the variation in the pilot injection quantity.

2. A fuel injection controller according to claim 1, wherein
   the injection quantity varying means varies the pilot injection quantity relative to a center value of the pilot injection quantity as a reference while varying the center value of the pilot injection quantity, and
   the injection quantity learning means learns the center value of the pilot injection quantity as a learning value when an advanced amount of the injection timing relative to the ignition timing at the center value is within a specified range of variation in a case that the injection quantity varying means increases the pilot injection quantity relative to the center value and when a retarded amount of the ignition timing relative to the ignition timing at the center value is within the specified range if variation in a case that the injection quantity varying means decreases the pilot injection quantity relative to the center value.

3. A fuel injection controller according to claim 1, further comprising
   a defining means for defining the driving condition into a plurality of specified ranges, wherein
   the injection quantity varying means varies the pilot injection quantity with respect to each specified range,
   the ignition variation detecting means detects the variation in ignition timing due to the variation in pilot injection quantity with respect to each specified range, and
   the injection quantity learning means learns the pilot injection quantity with respect to each specified range based on the variation in ignition timing due to the variation in pilot injection quantity.

4. A fuel injection controller according to claim 1, further comprising
an injection timing feedback means for feedback controlling the injection timing of the main injection based on a difference between an actual ignition timing of the main injection and a target ignition timing of the main injection which are detected by the ignition timing detecting means.

5. A fuel injection controller according to claim 4, wherein the injection timing feedback means stops the feedback control while the pilot injection quantity is learned.

6. A fuel injection system comprising:
a fuel supply pump which pumps the fuel;
a common rail which accumulates the pumped fuel;
a fuel injector which injects the fuel accumulated in the common rail into a cylinder of an internal combustion engine; and
a fuel injection controller according to claim 1.

\* \* \* \* \*